United States Patent
Champagne et al.

(10) Patent No.: US 7,159,838 B2
(45) Date of Patent: Jan. 9, 2007

(54) APPARATUS FOR SQUEEZING PIPES AND METHOD OF USE

(75) Inventors: Gaétan Champagne, Montreal (CA); Louis Raymond, Ville d'Anjou (CA); Marc St-Pierre, Calixa Lavallé (CA)

(73) Assignee: Société en Commandite Gaz Métropolitain, Montréal (CA)

( * ) Notice: Subject to any disclaimer, the term of this patent is extended or adjusted under 35 U.S.C. 154(b) by 453 days.

(21) Appl. No.: 10/471,285

(22) PCT Filed: Mar. 19, 2002

(86) PCT No.: PCT/CA02/00375

§ 371 (c)(1),
(2), (4) Date: Feb. 6, 2004

(87) PCT Pub. No.: WO02/075187

PCT Pub. Date: Sep. 26, 2002

(65) Prior Publication Data

US 2004/0104366 A1 Jun. 3, 2004

(30) Foreign Application Priority Data

Mar. 19, 2001 (CA) .................................. 2341916

(51) Int. Cl.
*F16K 7/04* (2006.01)

(52) U.S. Cl. ....................................................... 251/7
(58) Field of Classification Search ................... 251/4, 251/7

See application file for complete search history.

(56) References Cited

U.S. PATENT DOCUMENTS 2,865,591 A * 12/1958 Holinshead .................... 251/8
4,978,100 A * 12/1990 Peurifoy ......................... 251/8
5,219,146 A * 6/1993 Thompson ..................... 251/7

* cited by examiner

*Primary Examiner*—Edward K. Look
*Assistant Examiner*—John K. Fristoe, Jr.
(74) *Attorney, Agent, or Firm*—Ogilvy Renault LLP; Guy J. Houle (57) ABSTRACT

An apparatus for squeezing pipes, comprising a first jaw having a first squeezing surface and a second jaw having a second squeezing surface. The first jaw and the second jaw are interconnected for relative displacement at proximal ends through a first shaft of the apparatus and at distal ends through a second shaft of the apparatus. The first squeezing surface and the second squeezing surface are separated by a gap adapted to receive a pipe therein. The first jaw is rotatable with respect to the first shaft and engageable with the second shaft such that the apparatus is mountable about a pipe with the pipe being positioned in the gap between the first and the second shaft. Actuation means are provided for axially displacing the first shaft to reduce the gap to squeeze the pipe between the first squeezing surface of the first jaw and the second squeezing surface of the second jaw to block at least partially fluid flow in the pipe, wherein at least one of the first and second jaws bends at a given level of squeezing of the pipe whereby greater pressure is applied on cross-sectional ends of the pipe being squeezed.

19 Claims, 6 Drawing Sheets

FIG_1

FIG_2

FIG_3

FIG_4

Fig_5

APPARATUS FOR SQUEEZING PIPES AND METHOD OF USE

TECHNICAL FIELD

The present invention generally relates to a pipe-squeezing apparatus for reducing a flow of fluid in a pipe and more particularly, but not exclusively, to shut off at least substantially a natural gas distribution pipe in pipe network for safety purposes.

BACKGROUND ART

In a natural gas distribution system, resilient pipes, such as polyethylene pipes, are frequently used for the underground distribution of natural gas.

Leaks in natural gas lines must be attended to quickly as natural gas is flammable. Furthermore, as the natural gas in such lines is under pressure, a leak of is natural gas (e.g., as a result of a breach in the line due to third party damages or other reasons) must be attended to quickly to limit the spreading of the natural gas.

U.S. Pat. No. 5,152,497, issued to Bissell on Oct. 6, 1992, and U.S. Pat. No. 5,219,146, issued to Thompson on Jun. 15, 1993, each disclose tools for squeezing resilient pipes in order to reduce the flow of natural gas upstream of the leaks or breaches. These tools are manually actuated, as it would be hazardous to use any electrical source in the vicinity of a natural gas leak. Also, an operator of these tools must be close to the mechanism to operate the tool. However, for safety reasons, the operator is often precluded from entering the excavated hole in which the natural gas leak has occurred. Accordingly, pipe access holes must be excavated upstream and/or downstream of the leak to safely reduce the fluid flow through the pipe. This results in an increase in the time of intervention. It is pointed out, however, that squeezing tools are not limited to being used for emergency leak blocking operations on pipes, whereby an operator may be in the vicinity of a pipe for the squeezing thereof.

Squeezing tools must provide given performances of blocking to the pipes they are squeezing. For instance, the blocking of a pipe to reduce a fluid flow below 300 L/hour is a known safety practice in the industry. In designing squeezing tools apt to perform such blocking of pipes, opposed design factors are taken into account. The tools must be as light as possible to be readily maneuverable. On the other hand, they must often squeeze pipes of relatively large diameter, for instance above four inches, whereby they must be rigid and sturdily built.

SUMMARY OF INVENTION

Therefore, it is a feature of the present invention to provide an apparatus for squeezing pipes and which is manually operable at a distance from the pipe.

It is a further feature of the present invention to provide a method of use of the apparatus of the present invention for squeezing pipes.

It is a still further feature of the present invention to provide an apparatus for squeezing pipes optimizing the above described design factors.

According to the above feature of the present invention, and from a broad aspect thereof, the present invention provides an apparatus for squeezing pipes, comprising a first jaw having a first squeezing surface and a second jaw having a second squeezing surface. The first jaw and the second jaw are interconnected for relative displacement through at least a first shaft. The first squeezing surface and the second squeezing surface are separated by a gap adapted to receive a pipe therein. The first jaw has a proximal end portion fixed to the first shaft. The second jaw has a proximal end portion at least slidingly connected to the first shaft. A handle is provided for positioning the gap about the pipe. The handle is substantially distant from the first and the second jaw such that the gap may be manually positioned about the pipe by an operator distantly located from the pipe. Actuation means are provided for axially displacing the first shaft to reduce the gap to squeeze the pipe between the first squeezing surface of the first jaw and the second squeezing surface of the second jaw to block at least substantially fluid flow in the pipe.

According to a further broad aspect of the present invention there is provided a method for squeezing a pipe comprising the steps of i) providing an apparatus having a first jaw and a second jaw being adapted to receive a pipe therebetween, the first jaw and the second jaw being interconnected at proximal ends for relative displacement through a first shaft of the apparatus and at distal ends through a second shaft of the apparatus, the first jaw being fixed to the first shaft, the second jaw being slidingly and rotatably connected to the first shaft and being slidably engaged to the second shaft, the first jaw being rotatable with the first shaft with respect to the second jaw so as to detachably engage the second shaft; ii) positioning the second jaw against the pipe and between the first and the second shaft; iii) rotating the first jaw to engage the first jaw to the second shaft, such that the pipe is between the first and the second jaw; iv) displacing the first jaw toward the second jaw by axially displacing the shafts so as to squeeze the pipe between the jaws.

According to a still further broad aspect of the present invention there is provided an apparatus for squeezing pipes, comprising a first jaw having a first squeezing surface and a second jaw having a second squeezing surface. The first jaw and the second jaw are interconnected for relative displacement at proximal ends through a first shaft of the apparatus and at distal ends through a second shaft of the apparatus. The first squeezing surface and the second squeezing surface are separated by a gap adapted to receive a pipe therein. The first jaw is rotatable with respect to the first shaft and engageable with the second shaft such that the apparatus is mountable about a pipe with the pipe being positioned in the gap between the first and the second shaft. Actuation means are provided for axially displacing the first shaft to reduce the gap to squeeze the pipe between the first squeezing surface of the first jaw and the second squeezing surface of the second jaw to block at least partially fluid flow in the pipe, wherein at least one of the first and second jaws bends at a given level of squeezing of the pipe whereby greater pressure is applied on cross-sectional ends of the pipe being squeezed.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
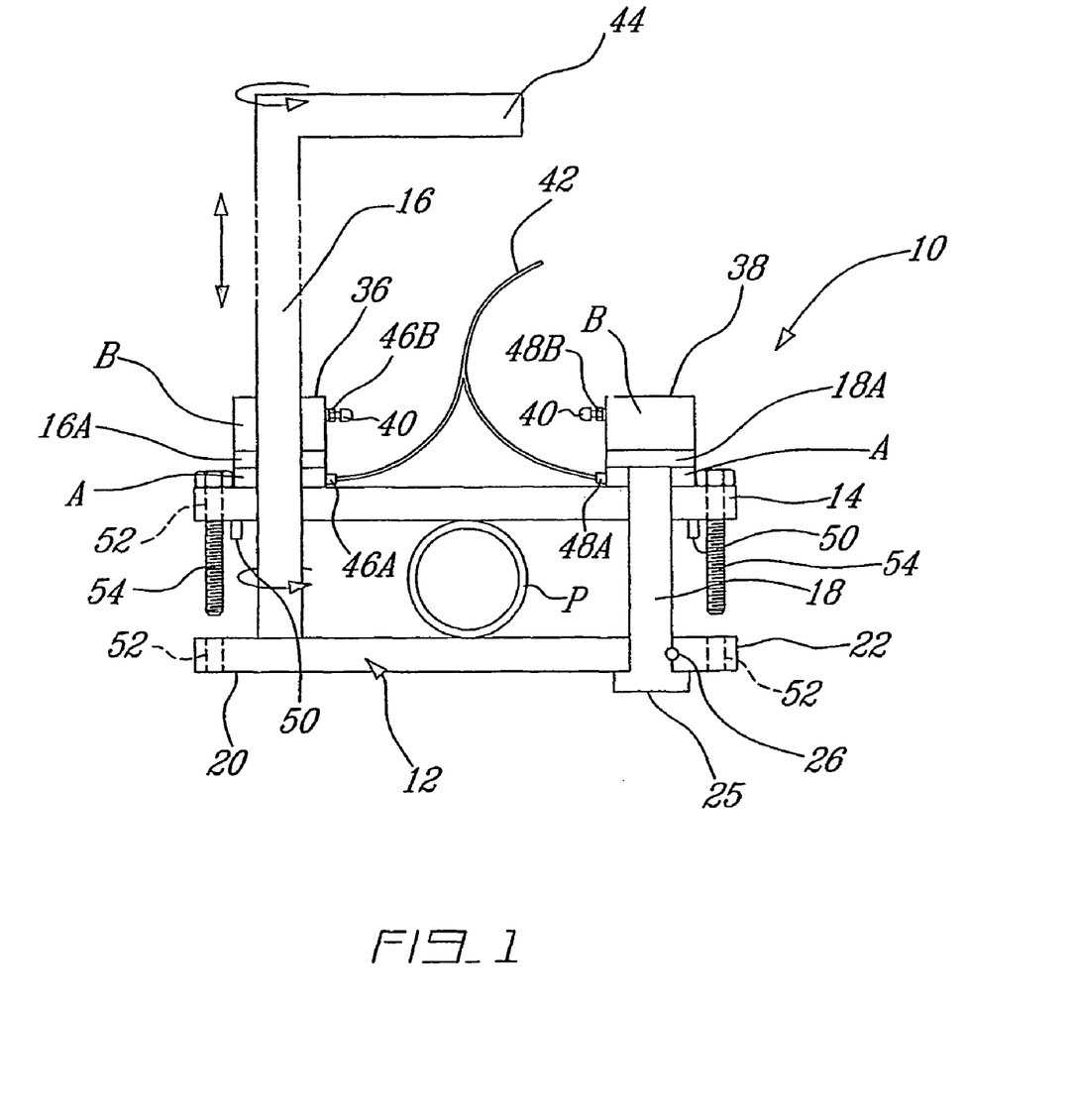
FIG. 1 is a schematic view of the pipe-squeezing apparatus constructed in accordance with the present invention.

Referring now to the drawings, and more particularly to FIG. 1, a pipe-squeezing apparatus in accordance with the present invention is generally shown at 10. The pipe-squeezing apparatus is illustrated mounted to a pipe P. The pipe P consists of a resilient material, such as polyethylene. The pipe P is typically used to convey a fluid, such as natural gas. The pipe-squeezing apparatus 10 has a lower jaw 12 and an upper jaw 14. The lower jaw 12 and the upper jaw 14 are interconnected by a pair of parallel shafts 16 and 18. More particularly, the lower jaw 12 is fixed at a first end 20 thereof to a bottom end of the shaft 16.

Figure 3:
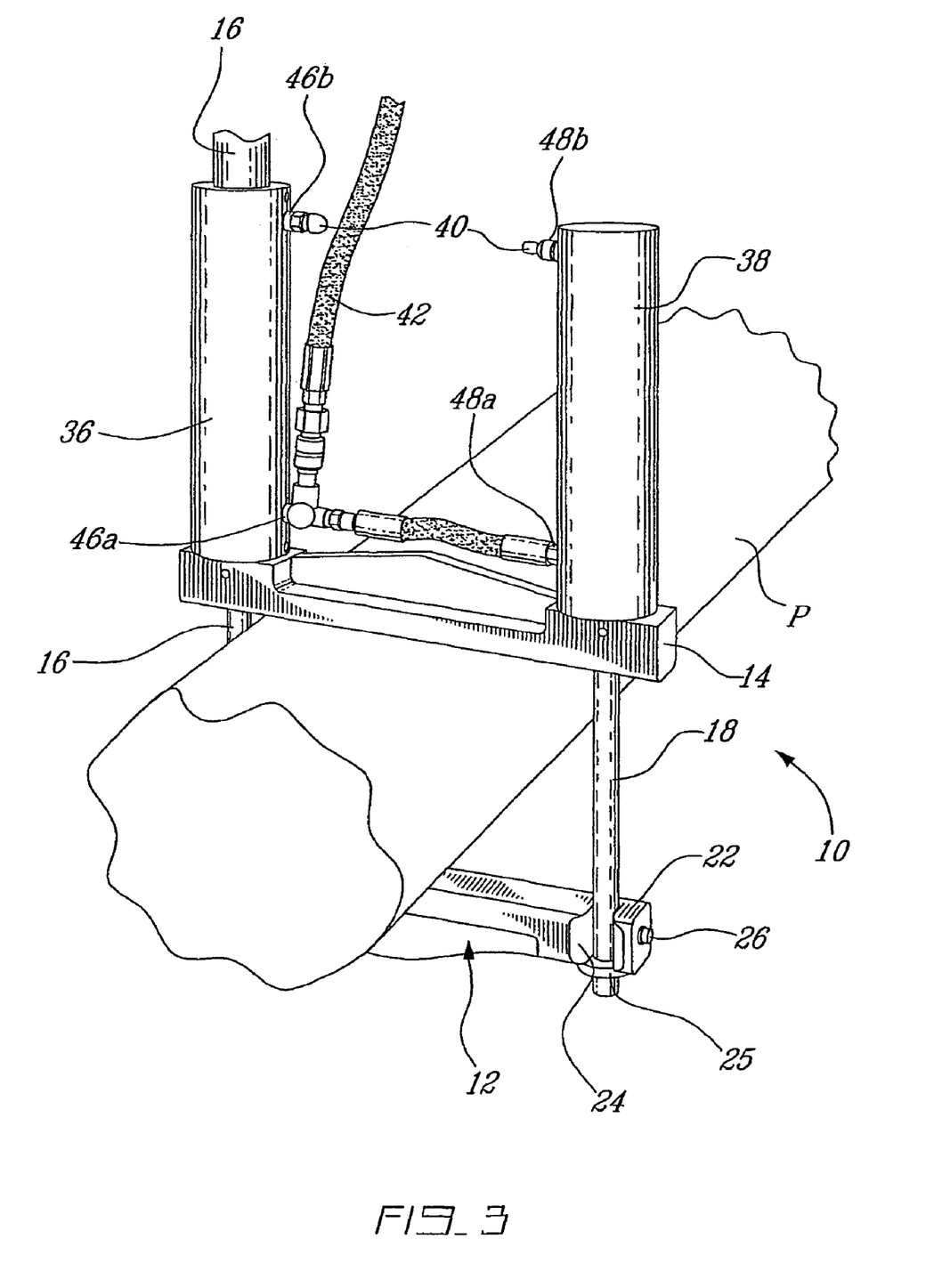
FIG. 3 is a perspective view of the pipe-squeezing apparatus with the lower jaw closed for capturing the pipe from opposed sides.

As best seen in FIG. 3, a slot 24 is positioned in a second end 22 of the lower jaw 12. As will be explained hereinafter, the shaft 16 rotates and, therefore, the lower jaw 12 rotates or swings about an axis of the shaft 16. The slot 24 is positioned in the second free end 22 of the lower jaw 12 so as to clip onto a bottom end of the shaft 18. A flange 25 is fixed to the shaft 18 and has a top surface thereof coplanar with a bottom surface of the jaw 12 when the latter is clipped to the shaft 18.

A pin 26 has a first free end thereof (not shown) protruding in the slot 24, and is biased toward the slot 24. A corresponding bore 28 (FIG. 2) on the shaft 18 is positioned opposite to the pin 26 when the shaft 18 is received in the slot 24, such that the pin 26 snaps into the bore 28 to lock the lower jaw 12 to the shaft 18, and this position is referred to as the locked position. A second end of the pin 26, as clearly seen in FIG. 3, protrudes outwardly from the second end 22 of the lower jaw 12. The second end of the pin 26 protrudes out from the second end 22 enough to be pulled manually upon the removal of the apparatus 10 from the hole.

Cylinders 36 and 38 extend upwardly from the upper jaw 14. As seen in FIG. 1, the shafts 16 and 18 are part of the cylinders 36 and 38, respectively, and hence an actuation of the cylinders 36 and 38 displaces the shafts 16 and 18 vertically, respectively. The cylinders 36 and 38 are typical cylinders each having a piston therein displaceable axially in the cylinders 36 and 38 according to fluids inserted into inlets of the cylinders. More precisely, the cylinders 36 and 38 are shown having pistons 16A and 18A, respectively. The pistons 16A and 18A are fixed to the shafts 16 and 18, respectively, and each separate inner cavity of their respective cylinders in chambers A and B, as best shown in FIG. 1. The cylinder 36 has an upward displacement inlet 46A open to the chamber A thereof and a downward displacement inlet 46B open to the chamber B thereof. Similarly, the cylinder 38 has an upward displacement inlet 48A open to the chamber A thereof and a downward displacement inlet 48B open to the chamber B thereof.

In a typical operation of the cylinder 36, a fluid is inserted into the chamber A thereof through the inlet 46A for displacing upwardly the shaft 16. During an upward displacement of the shaft 16, the inlet 46B serves as an outlet for fluid accumulated in the chamber B thereof. The operation of the cylinder 38 is similar to the operation of the cylinder 36. It is pointed out that the downward displacement inlets 46B and 48B are blocked with plugs 40. A supply line 42 is connected to both the upper displacement inlets 46A and 48A so as to supply the cylinders 36 and 38 with a fluid to displace the shafts 16 and 18, respectively, in an upward direction. The hydraulic supply line 42 is connected to a fluid source, such as a hydraulic pump (not shown), capable of supplying a fluid in the chambers A of the cylinders 36 and 38, and holding the fluid under pressure therein. It is obvious that a manually operated pump is preferred over electrically powered pumps, for safety reasons due to the leak of natural gas. If the pump is electrically powered, the supply line 42 must be long enough for the electrically powered pump to be operated at a safe distance.

Figure 6:
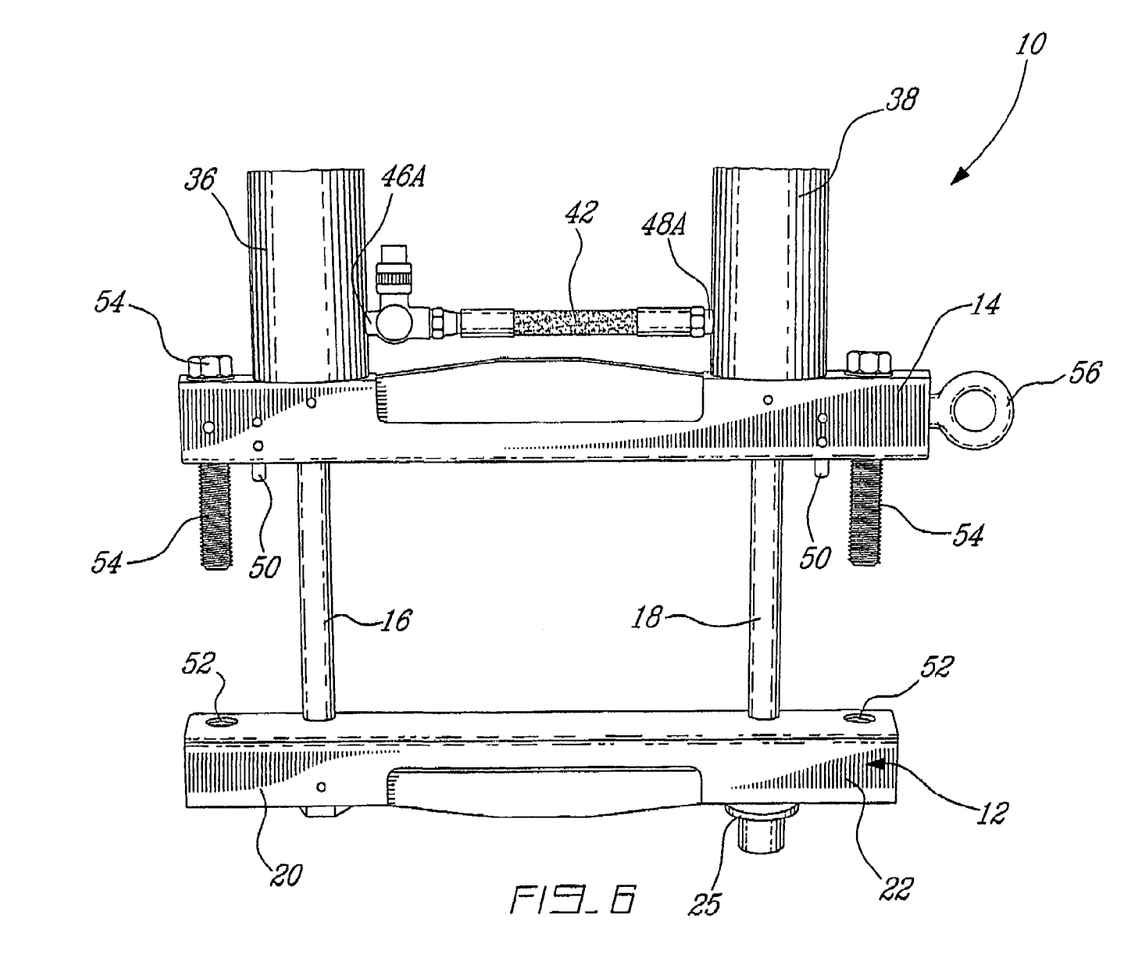
FIG. 6 is a perspective view of pipe squeezing apparatus.

Referring to FIG. 1, the shaft 16 extends upwardly from the cylinder 36 and has a handle 44 projecting perpendicularly from a top end thereof. The handle 44 is rotatable so as to control the rotation of the lower jaw 12 through the shaft 16. As seen in FIGS. 1 and 6, adjustable abutment pins 50 are positioned on both ends of the upper jaw 14, facing toward the lower jaw 12, and limit the displacement of the upper jaw 14 toward the lower jaw 12, as will be explained hereinafter. Tapped holes 52 in the lower jaw 12 and the upper jaw 14 are in register, such that locking bolts 54 may be used to ensure that the jaws 12 and 14 remain in a given position with respect to one another when squeezing a pipe, for safety precautions. Finally, a positioning ring 56 is positioned on the upper jaw 14 and is provided such that an operator can use a perch or pole (not shown), to position the apparatus 10 on a pipe. It is pointed out that the adjustable abutment pins 50 and the locking bolts 54, although preferred, are optional to the apparatus 10.

Figure 2:
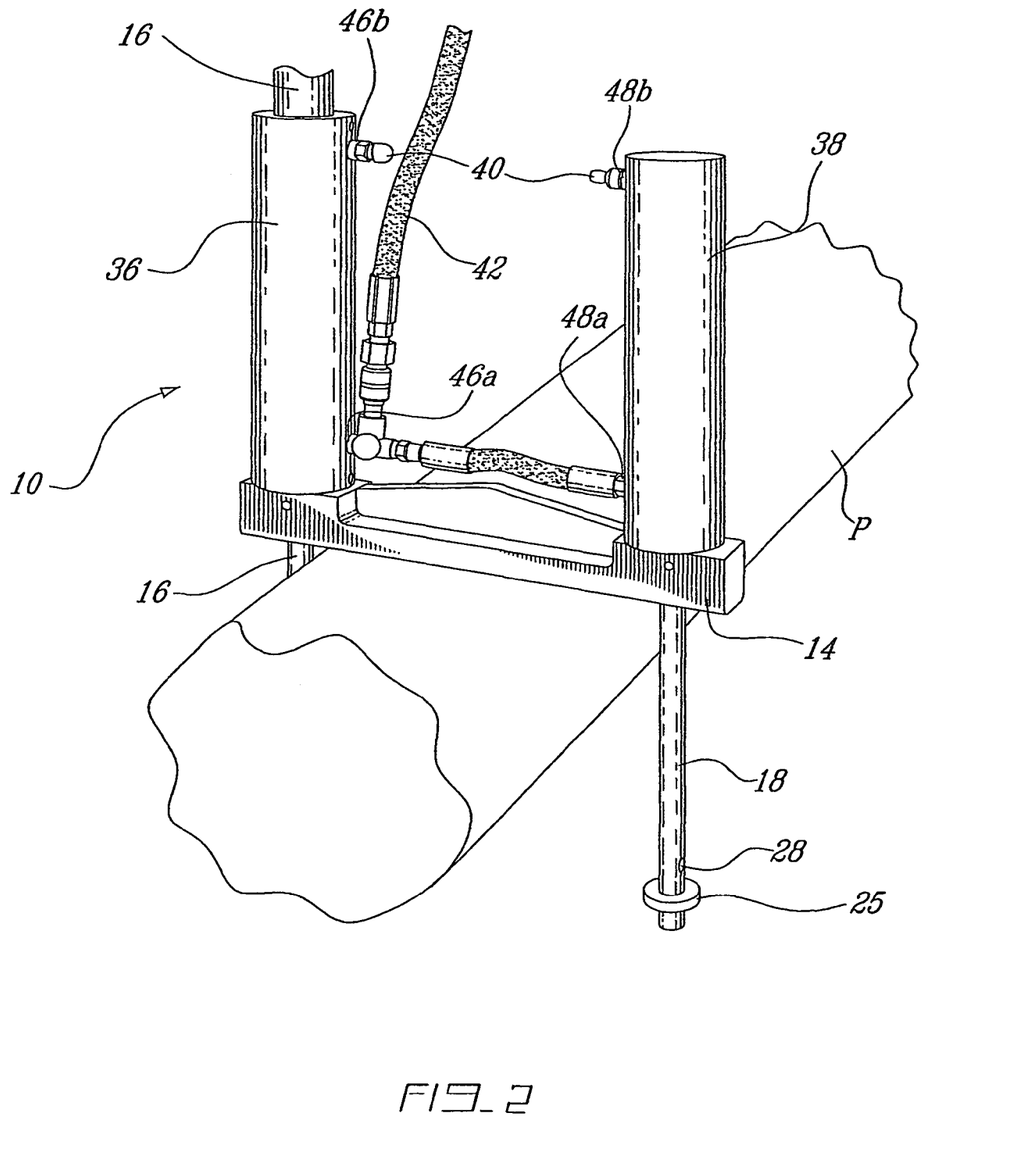
FIG. 2 is a perspective view of the pipe-squeezing apparatus having a lower jaw open for mounting to a pipe.

Now that the various parts of the pipe-squeezing apparatus 10 have been described in detail, an operation thereof for blocking pipes will be explained. Referring to FIG. 2, the pipe-squeezing apparatus 10 is shown as being mounted to the pipe P. More precisely, the handle 44 (not visible in FIG. 2) is rotated such that the lower jaw 12 (not visible in FIG. 2) is far enough from the shaft 18 to allow the pipe-squeezing apparatus 10 to have a bottom surface of the upper jaw 14 abut against the pipe P. Once the upper jaw 14 is abutted against the pipe P, the handle 44 (not shown in FIG. 2) is rotated such that the lower jaw 12 clips onto the shaft 18. An operator may use a perch or a pole engaged in the positioning ring 56 to facilitate the positioning of the apparatus 10 on the pipe P. The pin 26 snap-fits into the corresponding bore of the shaft 18, whereby the lower jaw 12 is in the locked position, as shown in FIG. 3. It is pointed out that the shaft 16 is long enough such that an operator rotating the handle 22 can be positioned at a safe distance above the pipe P. If the pipe P attended to is breached as a result of excavation, the shaft 16 is long enough for the operator to actuate the lower jaw 12 from outside the excavated hole.

Referring to FIG. 3, once the lower jaw 12 is in the locked position, the cylinders 36 and 38 are actuated so as to displace upwardly the lower jaw 12 to squeeze the pipe P between the jaws 12 and 14. More precisely, a fluid such as a hydraulic oil is supplied to the cylinders 36 and 38 by a hydraulic pump (not shown) via the line 42 connected to the upward displacement inlet couplings 46A and 48A, respectively. Accordingly, the lower jaw 12 moves in an upward direction. The flange 25 is solidly fixed to the shaft 18 so as to support the second end 22 of the lower jaw 12 during the squeezing of the pipe P. As the downward displacement inlet couplings 46B and 48B are blocked with plugs 40, air captured in the chambers B of the cylinders 36 and 38 is compressed by the upward movement of the pistons 16A and 18A.

Figure 4:
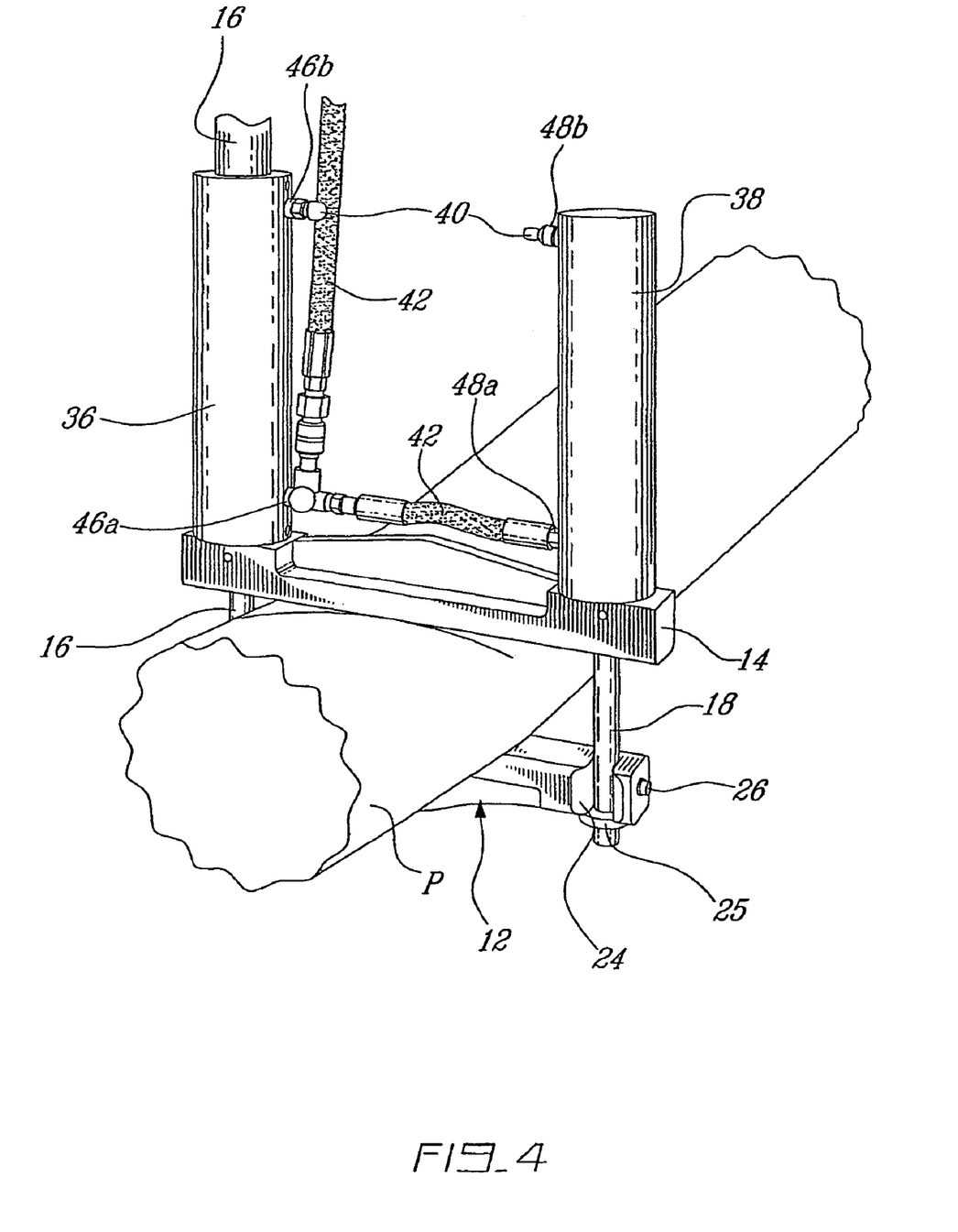
FIG. 4 is a perspective view of the pipe-squeezing apparatus partially squeezing the pipe.

Referring now to FIG. 4, the pipe P is shown partially blocked by the jaws 12 and 14. The pipe-squeezing apparatus 10 has not yet finished its upward travel to block the pipe P. It is pointed out that the pipe-engaging surfaces of the jaws 12 and 14 that are in contact with the pipe P have smooth surfaces to prevent further damage to the pipe P.

Figure 5:
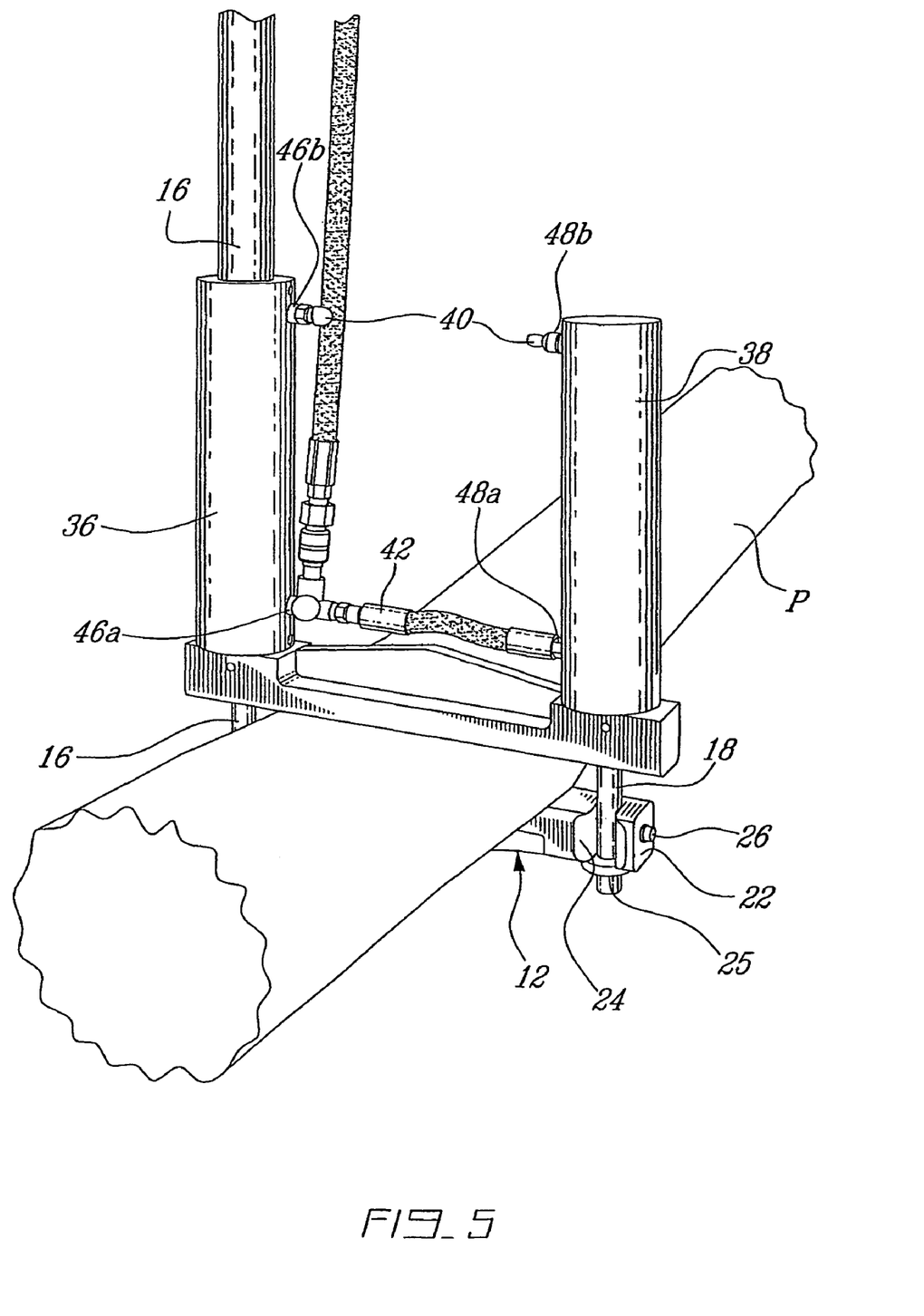
FIG. 5 is a perspective view of the pipe-squeezing apparatus fully blocking the pipe.

Referring to FIG. 5, the pipe P is shown blocked by the jaws 12 and 14. At that point, the fluid conveyed in the pipe P is substantially prevented from circulating therethrough, i.e., the flow of fluid is below safety levels allowed by the industry. It is pointed out that the abutment pins 50 limit the squeezing of the pipe P, by preventing the lower jaw 12 from being brought closer to the upper jaw 14. This is to ensure that the pipe P is not damaged by a squeeze. When the pipe P is blocked by the pipe-squeezing apparatus 10, the pipe P may be attended to for repairs. The operator may insert the locking bolts 54 in the tapped holes 52 in order to ensure that the jaws 12 and 14 remain in position.

Once the repairs are done, the pipe-squeezing apparatus 10 is disconnected by releasing the fluid pressure that keeps the jaws 12 and 14 blocking the pipe P. When the pressure is released by the hydraulic pump (not shown), the compressed air in the chambers B of the cylinders 36 and 38 will cause the lower jaw 12 to be displaced outwardly, whereby the pipe P will no longer be squeezed between the jaws 12 and 14. Once the pipe P has regained its shape, the pipe-squeezing apparatus 10 may be removed. The pin 26 engaged in the bore 28 must be disengaged for the lower jaw 12 to be rotated away from the shaft 18. At this point, it is no longer dangerous for an operator to approach the pipe P, as the leaks have been attended to. Therefore, the pin 26 may be pulled away from the bore 28 and, thereafter, the handle 44 is rotated such that the lower jaw 12 is separated from the shaft 18. Accordingly, the pipe-squeezing apparatus 10 may be removed from the pipe P.

Although the preferred embodiment proposes using the shafts 16 and 18 such that the first jaw 12 is adequately supported at both ends thereof, it is obvious that the apparatus 10 may be provided with only one shaft, such that the pipe is positioned between the first jaw 12 and the second jaw 14 laterally. This saves the step of rotating the first jaw 12 into engagement with the second shaft 18.

In a preferred embodiment of the present invention, the lower jaw 12 and the upper jaw 14 are bendable, such that they bend at some point during the squeezing of a pipe. The reason for such bending of the lower jaw 12 and the upper jaw 14 is that a pipe being squeezed forms ears in opposed ends of its cross section. Ears are formed at these opposed ends as there is more pipe material at these two areas. Therefore, it has been known to make the jaws 12 and 14 more rigid, and to increase the squeezing pressure of squeezing tools for substantially blocking these ears and ensure the fluid flow through the blocked pipe is below allowed levels by the industry. However, this requires more rigid jaws, which results in an increase of weight of the squeezing tools, and this must be avoided in order to have an easily maneuverable tool.

If the jaws 12 and 14 are relatively resilient such that they bend when the ears are formed, they will be applying more pressure on opposed ends of the cross-section of the pipe, i.e. the ears, than in the middle of the pipe where the jaws will bow outwardly as that section is furthest from the shafts and more flexible. Fluid flow is substantially reduced through the ear sections of the pipe. This is possible because of the configuration of the apparatus 10, wherein the jaws 12 and 14 are actuated from opposed ends thereof. Accordingly, the apparatus 10 constructed in accordance with the present invention does not require more rigid jaws for effectively squeezing pipes to block them, and this results in significant weight minimization, especially in an apparatus 10 sized for squeezing pipes of diameters above four inches. It is pointed out that only one of the jaws 12 and 14 is required to be relatively resilient, although it is preferred that both the jaws 12 and 14 are bendable.

It is within the ambit of the present invention to cover any obvious modifications of the embodiments described herein, provided such modifications fall within the scope of the appended claims.

The invention claimed is:

1. An apparatus for squeezing pipes, comprising:
a first jaw having a first squeezing surface and a second jaw having a second squeezing surface, the first jaw and the second jaw being interconnected for relative displacement through at least a first shaft, the first squeezing surface, and the second squeezing surface being separated by a gap adapted to receive a pipe therein, the first jaw having a proximal end portion fixed to the first shaft, the second jaw having a proximal end portion at least slidingly connected to the first shaft;
a handle for positioning the gap about the pipe, the handle being substantially distant from the first and the second jaw such that the gap may be manually positioned about the pipe by an operator distantly located from the pipe;
and actuation means for axially displacing the first shaft to reduce the gap to squeeze the pipe between the first squeezing surface of the first jaw and the second squeezing surface of the second jaw to block at least substantially fluid flow in the pipe.

2. The apparatus according to claim 1, wherein the second jaw has a distal end portion slidingly receiving a second shaft, the first shaft being axially rotatable with respect to the second jaw such that the first jaw can rotate with respect to the second jaw to detachably engage the second shaft, such that the gap about the pipe has the pipe between the first and second shaft.

3. The apparatus according to claim 2, wherein the handle is connected to the first shaft so as to be operable to rotate the first jaw to engage the second shaft.

4. The apparatus according to any one of claims 2 and 3, wherein the first and the second shafts are axially displaceable by an actuation of the actuation means.

5. The apparatus according to claim 4, wherein the actuation means are cylinders and the shafts are piston shafts.

6. The apparatus according to claim 5, wherein the shafts are axially biased by a compressed fluid captured in the cylinders so as to increase the gap when actuation on the cylinders is released.

7. The apparatus according to claim 2, wherein the first jaw engages a snap connection with the second shaft by the first jaw being rotated toward the second shaft.

8. The apparatus according to claim 7, wherein the first jaw has a slot for mating with second shaft, and a spring biased pin in the slot for snap engagement with a corresponding bore in the shaft.

9. The apparatus according to claim 8, wherein the spring biased pin is retractable for removing the apparatus from the pipe.

10. The apparatus according to claim 2, wherein the second shaft has a flange radially extending from a free end thereof, the flange being coplanar with a surface of the first jaw opposite the first squeezing surface, so as to support the first jaw when the pipe is squeezed between the first and the second jaw.

11. The apparatus according to claim 2, wherein at least one abutment pin is provided on one of the first and the second squeezing surfaces for preventing said gap from being reduced below a predetermined level.

12. The apparatus according to claim 2, wherein locking means are provided so as to lock the jaws in a desired squeezing position of the pipe.

13. The apparatus according to claim 2, wherein at least one of the first and second jaws bends at a given level of squeezing of the pipe whereby greater pressure can be applied on cross-sectional ends of the pipe being squeezed.

14. The apparatus according to claim 1, wherein engagement means are provided on the second jaw for connection with a pole so as to facilitate the positioning of the apparatus about the pipe.

15. The apparatus according to claim 14, wherein the engagement means is a ring secured to said second jaw.

16. A method for squeezing a pipe comprising the steps of:
  i) providing an apparatus having a first jaw and a second jaw being adapted to receive a pipe therebetween, the first jaw and the second jaw being interconnected at proximal ends for relative displacement through a first shaft of the apparatus and at distal ends through a second shaft of the apparatus, the first jaw being fixed to the first shaft, the second jaw being slidingly and rotatably connected to the first shaft and being slidably engaged to the second shaft, the first jaw being rotatable with the first shaft with respect to the second jaw so as to detachably engage the second shaft;
  ii) positioning the second jaw against the pipe and between the first and the second shaft;
  iii) rotating the first jaw to engage the first jaw to the second shaft, such that the pipe is between the first and the second jaw;
  iv) displacing the first jaw toward the second jaw by axially displacing the shafts so as to squeeze the pipe between the jaws.

17. The method according to claim 16, wherein the apparatus provided in step i) has a handle portion located distantly from the jaws, and the step iv) is performed by actuation means positioned distantly from the pipe and operated by an operator.

18. The method according to claim 16, further comprising a step v) of locking the first jaw to the second jaw in a squeezing position of the jaws on the pipe.

19. An apparatus for squeezing pipes, comprising:
  a first jaw having a first squeezing surfaces and a second jaw having a second squeezing surface, the first jaw and the second jaw being interconnected for relative displacement at proximal ends through a first shaft of the apparatus and at distal ends through a second shaft of the apparatus, the first squeezing surface and the second squeezing surface being separated by a gap adapted to receive a pipe therein, the first jaw being rotatable with respect to the first shaft and engageable with the second shaft such that the apparatus is mountable about a pipe with the pipe being positioned in the gap between the first and the second shaft; and
  actuation means for axially displacing the first shaft to reduce the gap to squeeze the pipe between the first squeezing surface of the first jaw and the second squeezing surface of the second jaw to block at least partially fluid flow in the pipe;
  wherein at least one of the first and second jaws bends at a given level of squeezing of the pipe whereby greater pressure is applied on cross-sectional ends of the pipe being squeezed.

* * * * *